United States Patent
Liu et al.

(10) Patent No.: US 11,044,742 B2
(45) Date of Patent: *Jun. 22, 2021

(54) UPLINK SCHEDULING METHOD BASED ON A DYNAMIC FRAME STRUCTURE, UPLINK SCHEDULING DEVICE, AND BASE STATION

(71) Applicant: YULONG COMPUTER TELECOMMUNICATION SCIENTIFIC (SHENZHEN) CO., LTD., Shenzhen (CN)

(72) Inventors: Shi-Xiao Liu, Shenzhen (CN); Yan-Tao Zhong, Shenzhen (CN); Xiong-Wei Guo, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 165 days.

This patent is subject to a terminal disclaimer.

(21) Appl. No.: 16/324,969

(22) PCT Filed: Sep. 27, 2016

(86) PCT No.: PCT/CN2016/100285
§ 371 (c)(1),
(2) Date: Feb. 12, 2019

(87) PCT Pub. No.: WO2018/032575
PCT Pub. Date: Feb. 22, 2018

(65) Prior Publication Data
US 2019/0174526 A1 Jun. 6, 2019

(30) Foreign Application Priority Data
Aug. 16, 2016 (CN) .......................... 201610674606.2

(51) Int. Cl.
*H04W 72/12* (2009.01)
*H04W 72/04* (2009.01)
(Continued)

(52) U.S. Cl.
CPC ........... *H04W 72/1284* (2013.01); *H04L 1/00* (2013.01); *H04L 1/0007* (2013.01);
(Continued)

(58) Field of Classification Search
CPC ....... H04L 1/00; H04L 1/0007; H04L 1/1806; H04L 1/1854; H04L 1/1887; H04L 5/001;
(Continued)

(56) References Cited

U.S. PATENT DOCUMENTS

| 2015/0036559 A1* | 2/2015 | Zhang ................ H04L 1/1864 370/280 |
| 2017/0290048 A1* | 10/2017 | Amuru .............. H04W 74/0808 |
| 2017/0303306 A1* | 10/2017 | Lee ........................ H04W 72/14 |

FOREIGN PATENT DOCUMENTS

| CN | 101841846 A | 9/2010 |
| CN | 105024790 A | 11/2015 |

(Continued)

*Primary Examiner* — Pankaj Kumar
*Assistant Examiner* — Kokou R Detse
(74) *Attorney, Agent, or Firm* — ScienBiziP, P.C.

(57) ABSTRACT

The present disclosure provides an uplink scheduling method in an unlicensed frequency band based on a dynamic frame structure, an uplink scheduling device and a base station. Each frame structure includes uplink and downlink subframes, and same type of a subframe continuity settings, the method includes: determining whether a currently used frame structure in an unlicensed frequency band needs to be reconfigured; when reconfiguration is not required, determining an uplink subframe to be scheduled on each downlink subframe according to the currently used frame structure; when reconfiguration is required, determining an (Continued)

uplink subframe to be scheduled on each downlink subframe in a last radio frame before a reconfiguration time point according to a first frame structure used before the reconfiguration time point and a second frame structure to be used; transmitting a scheduling instruction for the uplink subframe to be scheduled on each downlink subframe.

20 Claims, 10 Drawing Sheets

(51) Int. Cl.
  *H04L 1/00* (2006.01)
  *H04L 1/18* (2006.01)
  *H04W 16/14* (2009.01)
(52) U.S. Cl.
  CPC .......... *H04L 1/1806* (2013.01); *H04L 1/1854* (2013.01); *H04L 1/1887* (2013.01); *H04W 16/14* (2013.01); *H04W 72/04* (2013.01); *H04W 72/0446* (2013.01); *H04W 72/0453* (2013.01); *H04W 72/1268* (2013.01)
(58) Field of Classification Search
  CPC .... H04L 5/0094; H04W 16/14; H04W 72/04; H04W 72/0446; H04W 72/0453; H04W 72/1268; H04W 72/1284; H04W 72/1289
  USPC ........................................................ 370/329
  See application file for complete search history.

(56) References Cited

FOREIGN PATENT DOCUMENTS

| | | | |
|---|---|---|---|
| CN | 105657847 A | 6/2016 | |
| WO | 2014196276 A1 | 12/2014 | |
| WO | WO-2015010595 A1 * | 1/2015 | ........... H04L 1/1893 |
| WO | 2015131749 A1 | 9/2015 | |

* cited by examiner

UPLINK SCHEDULING METHOD BASED ON A DYNAMIC FRAME STRUCTURE, UPLINK SCHEDULING DEVICE, AND BASE STATION

CROSS-REFERENCE TO RELATED APPLICATIONS

The present disclosure relates to a technical field of communication, specifically an uplink scheduling method based on a dynamic frame structure in an unlicensed frequency band, an uplink scheduling device based on the dynamic frame structure in the unlicensed frequency band, and a base station.

FIELD

The present disclosure relates to a technical field of communication technology, specifically an uplink scheduling method based on a dynamic frame structure in an unlicensed frequency band, an uplink scheduling device based on the dynamic frame structure in the unlicensed frequency band, and a base station.

BACKGROUND

With rapid increase of communication traffic, the licensed spectrum of Third Generation Partnership Project (3GPP) is increasingly insufficient to provide network capacity. In order to further improve utilization of spectrum resources, the 3GPP provided a concept of Long Term Evolution (LTE) Assisted Access (LAA) for using an unlicensed spectrum with help of an LTE licensed spectrum. In order to make an LTE system coexist harmoniously with different systems such as Wi-Fi™ in an unlicensed frequency band, the 3GPP provides a mechanism of Listening Before Talk (LBT) to ensure fair allocation of the frequency spectrum resources used by different systems in the unlicensed frequency band. A working mode of the LTE system in the unlicensed spectrum may be a Time Division Duplexing (TDD) mode, a Supplemental Downlink (SDL) mode, or a dynamic uplink and downlink mode.

A physical layer frame structure of a Time Division Long Term Evolution (TD-LTE) is 10 ms, which includes two half-frames of 5 ms. Uplink and downlink subframe configurations of the TD-LTE are shown in Table 1:

TABLE 1

| Uplink and downlink subframe configuration | Uplink and downlink conversion cycle | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, for a TDD structure of a 5 ms downlink to uplink conversion cycle, one frame includes 8 normal subframes and 2 special subframes. Table 1 shows determination of whether the 8 normal subframes are used for uplink or downlink. For a TDD structure of a 10 ms downlink to uplink conversion cycle, one frame includes 9 normal subframes and one special subframe. Table 1 shows determination of whether the 9 normal subframes are used for uplink or downlink], and each normal subframe also includes 14 symbols.

A Hybrid Automatic Repeat Request (HARQ) mechanism is an important part of the LTE system to ensure transmission reliability, and a timing sequence of HARQ processes in different subframe configurations ensures efficient utilization of time-frequency resources. A traditional uplink HARQ timing sequence is synchronous, and a transmission and a retransmission of one HARQ process has a fixed timing sequence relationship. Since a receiver knows transmission time in advance, no additional instruction is required to represent a HARQ process number. A protocol defines two timing sequence relationships for a uplink synchronous HARQ, one is a timing sequence relationship from a base station transmitting uplink scheduling commands on a Physical Downlink Control Channel (PDCCH) to a terminal transmitting corresponding uplink data. The other is a timing relationship from the terminal transmitting uplink data to the base station feeding back ACK/NACK. Table 2 represents the two timing sequence relationships:

TABLE 2

| configuration number | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | −6/4/11 | −7/7/11 | −4/6/13 | | | −6/4/11 | −7/7/11 | −4/6/13 |
| 1 | | | −6/4/10 | −4/6/10 | | | | −6/4/10 | −4/6/10 | |
| 2 | | | −4/6/10 | | | | | −4/6/10 | | |
| 3 | | | −4/6/10 | −4/6/10 | −4/6/10 | | | | | |
| 4 | | | −4/6/10 | −4/6/10 | | | | | | |
| 5 | | | −4/6/10 | | | | | | | |
| 6 | | | −7/4/11 | −7/6/11 | −5/6/13 | | | −7/4/11 | −7/7/14 | |

As shown in Table 2, numbers −k1/k2/k3 in Table 2 respectively represent that: when data is transmitted on a subframe with a subframe number n, uplink scheduling instruction (e.g., Uplink (UL) grant) of a Physical Uplink Shared Channel (PUSCH) is transmitted in a subframe with a subframe number n−k1; the ACK/NACK information in the Physical Hybrid Automatic Repeat-reques (ARQ) indicator Channel (PHICH) is transmitted in the subframe with a subframe number n+k2; synchronous retransmission is performed in a subframe with a subframe number n+k3. When n−k1<0, the uplink scheduling instruction is transmitted in n−k1+10 in the previous radio frame; when n+k2>9 occurs, the ACK/NACK information is in subframe number (n+k2)%10 in the first radio frame after a current radio frame (% is the remainder symbol), and when n+k3>9 occurs, the synchronous retransmission is in subframe number (n+k3) %10 in the first radio frame after the current radio frame. When n+k3>19, synchronous retransmission is in subframe number (n+k) %10 in the second radio frame after the current radio frame.

With a development of Internet technology, communication traffic will continue to increase and service types will become more changeable. In an LAA micro-cell with few users, uplink and downlink services have characteristics of suddenness, making it difficult to maintain a stable service ratio between the uplink and downlink services. Statically configuring TD-LTE subframes cannot well adapt to such suddenness, thereby resulting in a waste of resources and a decline of usage efficiency.

Therefore, in order to better solve a problem caused by sudden changes of the services, a flexible and adaptive uplink and downlink subframe configuration mode between cells is required. For example, a fully dynamic TDD configuration can be adopted, the fully dynamic TDD configuration is to dynamically determine the subframe configuration in a period in the future according to a proportion of current uplink and downlink services volume of the cell. However, in the fully dynamic TDD, there is no optimized timing sequence of an uplink scheduling to ensure a stable and orderly transmission of the uplink data.

SUMMARY

Based on at least one of the above technical problems, the present disclosure provides a new uplink scheduling method in an unlicensed frequency band based on a dynamic frame structure, together with a device. For a scene of working with a dynamic frame structure in an unlicensed frequency band, an optimized uplink scheduling solution is provided to ensure a stable and orderly transmission of uplink data.

According to a first aspect of the present disclosure, an uplink scheduling method based on a dynamic frame structure in an unlicensed frequency band is provided. Each frame structure adopted in the unlicensed frequency band includes uplink subframes and downlink subframes, each frame structure having a same type of a subframe continuity settings. The uplink scheduling method includes: determining whether a currently used frame structure in an unlicensed frequency band needs to be reconfigured; when it is determined that the currently used frame structure in the unlicensed frequency band does not need to be reconfigured, determining an uplink subframe to be scheduled on each downlink subframe according to the currently used frame structure; when it is determined that the currently used frame structure in the unlicensed frequency band needs to be reconfigured, determining an uplink subframe to be scheduled on each downlink subframe in a last radio frame before a reconfiguration time point according to a first frame structure used before the reconfiguration time point and a second frame structure to be used; transmitting a scheduling instruction for the uplink subframe to be scheduled on each downlink subframe.

In the embodiment, since each frame structure adopted in the unlicensed frequency band includes the uplink subframes and the downlink subframes, a special subframe converted from the downlink to the uplink is discarded, thus time-frequency resources can be fully utilized. Channel detection is required when working in the unlicensed frequency band, therefore, by setting and including subframe continuity of the same type in each frame structure, that is, by setting continuities of the uplink subframes and the downlink subframes in each frame structure respectively, channel occupancy time per occupancy and instantaneous throughput can be maximized.

Frame structures that satisfy the above-described conditions have following types: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD.

The present disclosure adopts dynamic frame structure in the unlicensed frequency band, that is, the frame structure can be dynamically configured according to uplink and downlink traffic. Therefore, when it is not necessary to reconfigure the frame structure, the uplink subframe to be scheduled for each downlink subframe is directly determined according to a current frame structure. When it is necessary to reconfigure the frame structure, as the frame structure used before and after a reconfiguration time point may be changed, when determining a timing sequence of an uplink scheduling in the last radio frame before the reconfiguration time point, the frame structure used before and after the reconfiguration time point needs to be considered. Obviously, in the technical solution of the present disclosure, in a case where the reconfiguration of the frame structure in the unlicensed frequency band is required or is not required, solutions of determining the uplink subframe to be scheduled in the downlink subframe are provided respectively. The technical solution of the present disclosure provides an optimized uplink scheduling solution in the unlicensed frequency band to ensure a stable and orderly transmission of downlink data for a scene when working with a dynamic frame structure.

In above technical solution, optionally, the step of determining the uplink subframe to be scheduled on each downlink subframe according to the currently used frame structure includes: determining the uplink subframe to be scheduled on each downlink subframe according to a timing sequence of the uplink scheduling corresponding to the currently used frame structure.

In this technical solution, a plurality of types of frame structure are provided in the present disclosure. Therefore, when it is not necessary to reconfigure the frame structure, the uplink subframe to be scheduled on each downlink subframe can be determined according to the timing sequence of the uplink scheduling corresponding to the currently used frame structure.

In any of the above technical solutions, optionally, the step of determining the uplink subframe to be scheduled on each downlink subframe in the last radio frame before the reconfiguration time point according to the first frame structure used before the reconfiguration time point and the second frame structure to be used includes: determining the uplink subframe to be scheduled on each downlink subframe in the last radio frame before the reconfiguration time point according to a number of downlink subframes in the first frame structure and a number of downlink subframes in the second frame structure.

In this technical solution, when reconfiguration is necessary, the frame structure used before and after the reconfiguration time point may be changed, that is, the number of downlink subframes and uplink subframe in the frame structure may be changed. Therefore, to ensure stability and order of timing sequence of the uplink scheduling and to avoid a waste of resources, the uplink subframe to be scheduled on each downlink subframe in the last radio frame before the reconfiguration time point is needed to be determined, according to the number of downlink subframes used in the frame structure used before and after the reconfiguration time point.

In above technical solution, optionally, the uplink subframe to be scheduled on each downlink subframe in the last radio frame before the reconfiguration time point is determined according to the timing sequence of the uplink scheduling corresponding to the first frame structure when the number of the downlink subframe in the first frame structure is less than or equal to the number of the downlink subframe in the second frame structure.

Determining the uplink subframe to be scheduled on each downlink subframe in the last radio frame before the reconfiguration time point according to an union of the timing sequence of the first uplink scheduling and the timing sequence of the second uplink scheduling when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure.

In the technical solution, when the number of downlink subframes used in the first frame structure is less than or equal to the number of downlink subframes to be used in the second frame structure before the reconfiguration time point, the timing sequence of the uplink scheduling of the last radio frames before the reconfiguration time point may still use the timing sequence of the uplink scheduling corresponding to the first frame structure, so that when the uplink scheduling instruction is received on the downlink subframe in after the reconfiguration time point, it will be ignored. When the number of the downlink subframes used in the first frame structure is larger than the number of the downlink subframes used in the second frame structure before the reconfiguration time point, in order to ensure that each uplink subframe in the first radio frame after the reconfiguration time point can be scheduled, determining the uplink subframe to be scheduled on each downlink subframe in the last radio frames before the reconfiguration time point according to the union of the timing sequence of the uplink scheduling corresponding to the first frame structure (e.g., the first timing sequence of the uplink scheduling described above) and the timing sequence of the uplink scheduling corresponding to the second frame structure (e.g., the second timing sequence of the uplink scheduling described above).

In an embodiment of the present disclosure, when at least two downlink subframes need to schedule the same uplink subframe according to the union of the first timing sequence of the uplink scheduling and the second timing sequence of the uplink scheduling, a scheduling instruction for the same uplink subframe is sent in one of the at least two downlink subframes.

In this embodiment, as the uplink subframe to be scheduled on each downlink subframe in the last radio frame before the reconfiguration time point is determined according to the union of the timing sequence of the uplink scheduling corresponding to the first frame structure and the timing sequence of the uplink scheduling corresponding to the second frame structure, the problem may be that at least two downlink subframes schedule the same uplink subframe. When the problem occurs, a base station may send a scheduling instruction for the same uplink subframe in one of the at least two downlink subframes, to ensure that a terminal receives one uplink scheduling instruction in one uplink subframe.

In another embodiment of the present disclosure, when at least two downlink subframes need to schedule the same uplink subframe according to the union of the first timing sequence of the uplink scheduling and the second timing sequence of the uplink scheduling, sending a notification instruction to the terminal. Therefore when the terminal receives a plurality of scheduling instructions in one subframe, the latest received scheduling instruction is used.

In this embodiment, since the uplink subframe to be scheduled on each downlink subframe in the last radio frame before the reconfiguration time point is determined according to the union of the timing sequence of the uplink scheduling corresponding to the first frame structure and the timing sequence of the uplink scheduling corresponding to the second frame structure, there may be a problem that at least two downlink subframes schedule the same uplink subframe. When the problem occurs, the base station may send a notification instruction to the terminal, so that when the terminal receives a plurality of scheduling instructions in one subframe, the latest received scheduling instruction is adopted, thereby avoiding a problem of scheduling chaos when receiving a plurality of scheduling instructions on one subframe.

In any of the above technical solutions, optionally, a subframe interval between each downlink subframe and the uplink subframe to be scheduled is larger than or equal to 3, and is less than or equal to a predetermined value.

In this technical solution, as information transmission time and calculation processing time of the base station together needs at least 3 ms, the subframe interval between each downlink subframe and the uplink subframe to be scheduled should be larger than or equal to 3. For example, when a subframe n is a downlink subframe, the closest uplink subframe scheduled by the subframe n should be n+4 (there are 3 subframes between the closest uplink subframe and the subframe n). In addition, in order to ensure a timeliness of the scheduling, the subframe interval between each downlink subframe and the uplink subframe to be scheduled should be less than or equal to the predetermined value, that is, the uplink subframe to be scheduled on each downlink subframe is arranged to be as close as possible to the downlink subframe.

In any of the above technical solutions, optionally, when the frame structure used in the unlicensed frequency band includes a plurality of downlink subframes, the number of uplink subframes scheduled by the plurality of downlink subframes is equalized.

In this technical solution, by equalizing the number of the uplink subframes scheduled by the plurality of downlink subframes, excessive instruction for uplink scheduling on a certain downlink subframe can be avoided.

According to a second aspect of the disclosure, an uplink scheduling device based on a dynamic frame structure in an unlicensed frequency band is provided. Each frame structure adopted in the unlicensed frequency band includes uplink subframes and downlink subframes, and each frame structure having a same type of a subframe continuity settings, the uplink scheduling device includes: a determination unit configured to determine whether a currently used frame structure in an unlicensed frequency band needs to be reconfigured; a first determination unit configured to determine an uplink subframe to be scheduled on each downlink subframe according to the currently used frame structure when it is determined that the currently used frame structure in the unlicensed frequency band does not need to be reconfigured; a second determination unit configured to determine an uplink subframe to be scheduled on each downlink subframe in a last radio frame before a reconfiguration time point according to a first frame structure used before the reconfiguration time point and a second frame structure to be used when it is determined that the currently used frame structure in the unlicensed frequency band needs to be reconfigured; a sending unit configured to transmit a scheduling instruction for the uplink subframe to be scheduled on each downlink subframe.

In the embodiment, since each frame structure that adopted in the unlicensed frequency band includes the uplink subframes and the downlink subframes, a special subframe converted from the downlink to the uplink is discarded, thus time-frequency resources can be fully utilized. Channel detection is required when working in the unlicensed frequency band, therefore, by setting and including subframe continuity of the same type in each frame structure, that is, by setting continuities of the uplink subframes and the downlink subframes in each frame structure respectively, channel occupancy time can be maximized after occupying channel resources each time, and instantaneous throughput can be maximized.

Frame structures that satisfy the above-described conditions have following types: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD.

The present disclosure adopts dynamic frame structure in the unlicensed frequency band, that is, the frame structure can be dynamically configured according to uplink and downlink traffic. Therefore, when it is not necessary to reconfigure the frame structure, the uplink subframe to be scheduled for each downlink subframe is directly determined according to a current frame structure. When it is necessary to reconfigure the frame structure, as the frame structure used before and after a reconfiguration time point may be changed, when determining a timing sequence of an uplink scheduling in the last radio frame before the reconfiguration time point, the frame structure used before and after the reconfiguration time point needs to be considered. Obviously, in the technical solution of the present disclosure, in a case that the reconfiguration of the frame structure in the unlicensed frequency band is required or is not required, solutions of determining the uplink subframe to be scheduled in the downlink subframe are provided respectively. The technical solution of the present disclosure provides the optimized uplink scheduling solution in the unlicensed frequency band to ensure a stable and orderly transmission of downlink data for a scene when working with a dynamic frame structure.

In above technical solution, optionally, the first determination unit specifically configured to determine the uplink subframe to be scheduled on each downlink subframe according to a timing sequence of the uplink scheduling corresponding to the currently used frame structure.

In this technical solution, several types of frame structure are provided in the present disclosure. Therefore, when it is not necessary to reconfigure the frame structure, the uplink subframe to be scheduled on each downlink subframe can be determined according to the timing sequence of the uplink scheduling corresponding to the currently used frame structure.

In any of the above technical solutions, optionally, the second determination unit specifically configured to determine the uplink subframe to be scheduled on each downlink subframe in the last radio frame before the reconfiguration time point according to a number of downlink subframes in the first frame structure and a number of downlink subframes in the second frame structure.

In this technical solution, when reconfiguration is necessary, the frame structure used before and after the reconfiguration time point may be changed, that is, the number of downlink subframes and uplink subframe in the frame structure may be changed. Therefore, to ensure stability and order of timing sequence of the uplink scheduling and to avoid a waste of resources, the uplink subframe to be scheduled on each downlink subframe in the last radio frame before the reconfiguration time point is needed to be determined, according to the number of downlink subframes used in the frame structure used before and after the reconfiguration time point.

In above technical solution, optionally, the second determination unit also specifically configured to determine the uplink subframe to be scheduled on each downlink subframe in the last radio frame before the reconfiguration time point according to the timing sequence of the uplink scheduling corresponding to the first frame structure when the number of the downlink subframe in the first frame structure is less than or equal to the number of the downlink subframe in the second frame structure.

Determine the uplink subframe to be scheduled on each downlink subframe in the last radio frame before the reconfiguration time point according to an union of the timing sequence of the first uplink scheduling and the timing sequence of the second uplink scheduling when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure.

In the technical solution, when the number of downlink subframes used in the first frame structure is less than or equal to the number of downlink subframes to be used in the second frame structure before the reconfiguration time point, the timing sequence of the uplink scheduling of the last radio frames before the reconfiguration time point may still use the timing sequence of the uplink scheduling corresponding to the first frame structure. Thus an uplink scheduling instruction received on the downlink subframe after the reconfiguration time point will be ignored. When the number of the downlink subframes used in the first frame structure is larger than the number of the downlink subframes used in the second frame structure before the reconfiguration time point, in order to ensure that each uplink subframe in the first radio frame after the reconfiguration time point can be scheduled, determining the uplink subframe to be scheduled on each downlink subframe in the last radio frames before the reconfiguration time point according to the union of the timing sequence of the uplink scheduling corresponding to the first frame structure (e.g., the first timing sequence of the uplink scheduling described above) and the timing sequence of the uplink scheduling corresponding to the second frame structure (e.g., the second timing sequence of the uplink scheduling described above).

In an embodiment of the present disclosure, the sending unit also configured to send a scheduling instruction for the same uplink subframe in one of the at least two downlink subframes when the second determination unit determines that at least two downlink subframes are needed to schedule the same uplink subframe according to the union of the first timing sequence of the uplink scheduling and the second timing sequence of the uplink scheduling.

In this embodiment, as the uplink subframe to be scheduled on each downlink subframe in the last radio frame before the reconfiguration time point is determined according to the union of the timing sequence of the uplink scheduling corresponding to the first frame structure and the timing sequence of the uplink scheduling corresponding to the second frame structure, there may be a problem that at least two downlink subframes schedule the same uplink subframe. When the problem occurs, a base station may send a scheduling instruction for the same uplink subframe in one of the at least two downlink subframes, to ensure that a terminal receives one uplink scheduling instruction in one uplink subframe.

In another embodiment of the disclosure, the sending unit also configured to send a notification instruction to the terminal when the second determination unit determines that at least two downlink subframes are needed to schedule the same uplink subframe according to the union of the first timing sequence of the uplink scheduling and the second timing sequence of the uplink scheduling. Therefore when the terminal receives a plurality of scheduling instructions in one subframe, the latest received scheduling instruction is used.

In this embodiment, since the uplink subframe to be scheduled on each downlink subframe in the last radio frame before the reconfiguration time point is determined according to the union of the timing sequence of the uplink scheduling corresponding to the first frame structure and the timing sequence of the uplink scheduling corresponding to the second frame structure, there may be a problem that at least two downlink subframes schedule the same uplink subframe. When the problem occurs, the base station may send a notification instruction to the terminal, so that when the terminal receives a plurality of scheduling instructions in one subframe, the latest received scheduling instruction is adopted, thereby avoiding a problem of scheduling chaos when receiving a plurality of scheduling instructions on done subframe.

In any of the above technical solutions, optionally, a subframe interval between each downlink subframe and the uplink subframe to be scheduled is larger than or equal to 3, and is less than or equal to a predetermined value.

In this technical solution, as information transmission time and calculation processing time of the base station together needs at least 3 ms, the subframe interval between each downlink subframe and the uplink subframe to be scheduled should be larger than or equal to 3. For example, when a subframe n is a downlink subframe, the closest uplink subframe scheduled by the subframe n should be n+4 (there are 3 subframes between the closest uplink subframe and the subframe n). In addition, in order to ensure a timeliness of the scheduling, the subframe interval between each downlink subframe and the uplink subframe to be scheduled should be less than or equal to the predetermined value, that is, the uplink subframe to be scheduled on each downlink subframe is arranged to be as close as possible to the downlink subframe.

In any of the above technical solutions, optionally, when the frame structure used in the unlicensed frequency band includes a plurality of downlink subframes, the number of uplink subframes scheduled by the plurality of downlink subframes is equalized.

In this technical solution, by equalizing the number of the uplink subframes scheduled by the plurality of downlink subframes, excessive uplink scheduling instruction as an overhead on a certain downlink subframe can be avoided.

According to a third aspect of the disclosure, a base station is provided, which includes: an uplink scheduling device based on a dynamic frame structure in an unlicensed frequency band according to any one of the above technical solutions.

According to the above technical solutions, for working with a dynamic frame structure, the uplink scheduling solution in the unlicensed frequency band as described herein provides a stable and orderly transmission of uplink data.

DETAILED DESCRIPTION

In order to more clearly understand above objects, features and advantages of the present disclosure, a detailed description of the present disclosure is given below with reference to the accompanying drawings and the specific implementation modes. It should be noted that where no conflict exists, the embodiments of the present disclosure and the features in the embodiments can be combined with each other.

Many specific details are set forth in the following description to facilitate full understanding of the present disclosure, however, the present disclosure may also be implemented in other ways other than those described herein, the protection scope of the present disclosure is not limited by the specific embodiments disclosed below.

In a technical solution of the present disclosure, a dynamic frame structure adopted in an unlicensed frequency band is first provided. Specifically, a period of change of a subframe can be dynamic, such as 10 ms, 40 ms, etc. Such frame structure mainly meets the following requirements.

1. In order to ensure full utilization of time-frequency resources, there is no special subframe on a new frame structure when converting from downlink to uplink.

2. Since a mechanism of Listening Before Talk (LBT) exists in the unlicensed frequency band, a channel detection needs to be performed before channel resources are used. In one case, channel occupation is ended when a subframe with an opposite transmission direction is encountered while occupying a channel. Therefore, uplink subframes and downlink subframes in the new frame structure consecutively appear to ensure that channel occupation time can be maximized each time after occupying channel resources, thereby maximizing instantaneous throughput.

3. Since each uplink subframe "U" requires corresponding scheduling instruction sent by a base station to determine information of a corresponding code modulation mode etc., and ACK/NACK feedback messages corresponding to uplink data need to be sent on the downlink subframe, a frame structure for all uplink subframes is undesirable. ACK/NACK feedback messages corresponding to downlink data need to be sent on the uplink subframe, thus a frame structure for all downlink subframes is also undesirable.

Based on above requirements, the frame structure provided in the present disclosure specifically includes the following types: UDDDDDDDDD, UUDDDDDDDD, UUUDDDDDDD, UUUUDDDDDD, UUUUUDDDDD, UUUUUUDDDD, UUUUUUUDDD, UUUUUUUUDD, UUUUUUUUUD.

Since the method is based on a dynamic frame structure, it may be necessary to reconfigure a frame structure for subsequent use when a subframe reconfiguration cycle comes, to determine the frame structure for subsequent use according to a changed proportion of uplink and downlink services volume. In the present disclosure, time when the reconfiguration cycle comes is called a reconfiguration time point, configurations of subframes on a non-reconfigured time point do not change.

Figure 1:
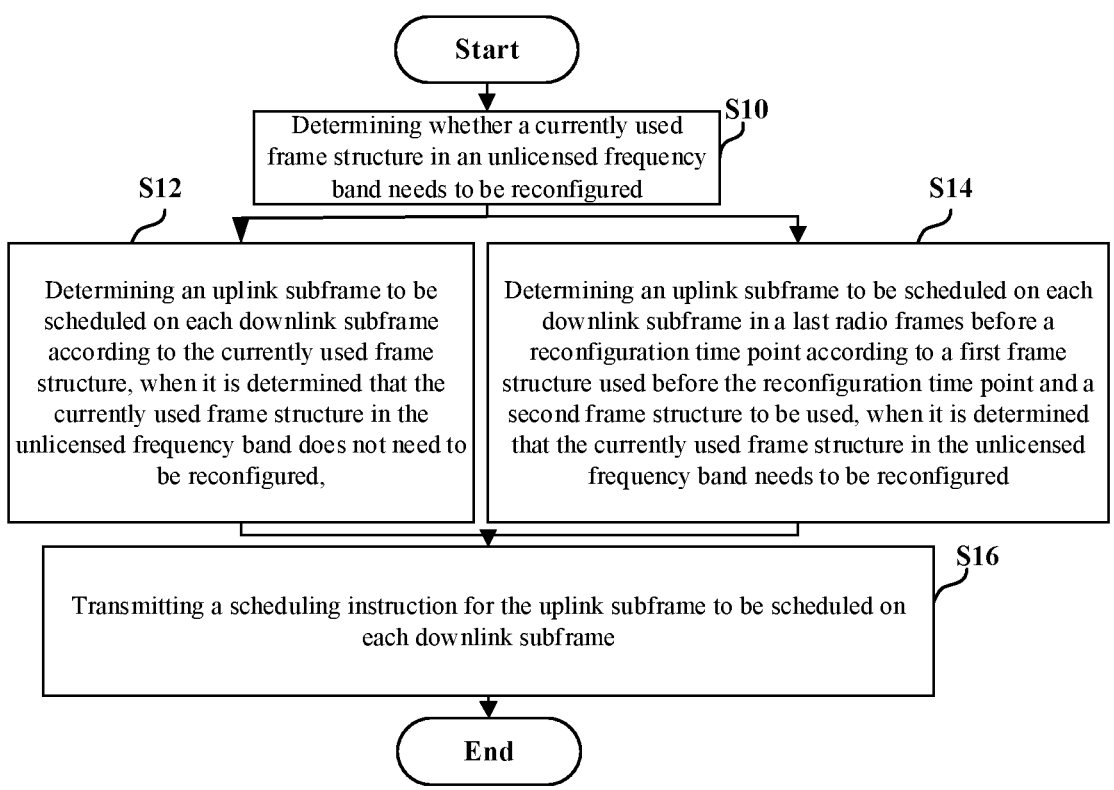
FIG. 1 shows a schematic flowchart diagram of an uplink scheduling method according to an embodiment of the present disclosure.

Based on the above frame structures, the uplink scheduling method in the unlicensed frequency band based on the dynamic frame structure provided in the present disclosure is shown in FIG. 1, the method includes:

Step 10, determining whether a currently used frame structure in an unlicensed frequency band needs to be reconfigured.

Step 12, determining an uplink subframe to be scheduled on each downlink subframe according to the currently used frame structure, when it is determined that the currently used frame structure in the unlicensed frequency band does not need to be reconfigured.

In one embodiment of the present disclosure, the step 12 specifically includes: determining the uplink subframe to be scheduled on each downlink subframe according to a timing sequence of the uplink scheduling corresponding to the currently used frame structure. When it is not necessary to reconfigure the frame structure, the uplink subframe to be scheduled on each downlink subframe can be determined directly according to the timing sequence of the uplink scheduling corresponding to the currently used frame structure.

Step 14, determining an uplink subframe to be scheduled on each downlink subframe in a last radio frame before a reconfiguration time point according to a first frame structure used before the reconfiguration time point and a second frame structure to be used, when it is determined that the currently used frame structure in the unlicensed frequency band needs to be reconfigured.

In one embodiment of the present disclosure, the step 14 specifically includes: determining the uplink subframe to be scheduled on each downlink subframe in the last radio frame before the reconfiguration time point according to a number of downlink subframes in the first frame structure and a number of downlink subframes in the second frame structure.

Specifically, determining the uplink subframe to be scheduled on each downlink subframe in the last radio frame before the reconfiguration time point according to the timing sequence of the uplink scheduling corresponding to the first frame structure when the number of the downlink subframes in the first frame structure is less than or equal to the number of the downlink subframes in the second frame structure.

Determining the uplink subframe to be scheduled on each downlink subframe in the last radio frame before the reconfiguration time point according to a union of the timing sequence of the first uplink scheduling and the timing sequence of the second uplink scheduling when the number of downlink subframes in the first frame structure is larger than the number of downlink subframes in the second frame structure, the timing sequence of the first uplink scheduling is the timing sequence of the uplink scheduling corresponding to the first frame structure, and the timing sequence of the second uplink scheduling is the timing sequence of the uplink scheduling corresponding to the second frame structure.

When the number of the downlink subframes used in the first frame structure is larger than the number of the downlink subframes used in the second frame structure, determining the uplink subframe to be scheduled in the last radio frames before the reconfiguration time point according to the union of the timing sequence of the uplink scheduling corresponding to the first frame structure (e.g., the first timing sequence of the uplink scheduling described above) and the timing sequence of the uplink scheduling corresponding to the second frame structure (e.g., the second timing sequence of the uplink scheduling described above). There may be a problem that at least two downlink subframes schedule the same uplink subframe, for this problem, the present disclosure provides two solutions:

Solution 1: a base station sends a scheduling instruction for the same uplink subframe in one of the at least two downlink subframes, to ensure that a terminal receives one uplink scheduling instruction in one uplink subframe.

Solution 2: the base station sends a notification instruction to the terminal, to ensure that when the terminal receives a plurality of scheduling instructions in one subframe, the latest received scheduling instruction is used, thereby avoiding a problem of scheduling chaos when receiving a plurality of scheduling instructions on one sub frame.

For a subframe interval between each downlink subframe and the uplink subframe for the downlink subframe scheduled, there is a rule: a subframe interval between each downlink subframe and the uplink subframe that the downlink subframe scheduled is larger than or equal to 3, and is less than or equal to a predetermined value.

Specifically, as information transmission time and calculation processing time of the base station needs at least 3 ms, the subframe interval between each downlink subframe and the uplink subframe to be scheduled should be larger than or equal to 3. For example, when a subframe n is a downlink subframe, the closest uplink subframe scheduled by the subframe n should be n+4 (there are 3 subframes between the closest uplink subframe and the subframe n). In addition, in order to ensure timeliness of the scheduling, the subframe interval between each downlink subframe and the uplink subframe to be scheduled should be less than or equal to the predetermined value, that is, the uplink subframe to be scheduled on each downlink subframe is arranged to be as close as possible to the downlink subframe.

In addition, in order to avoid a problem of excessive uplink scheduling instruction as overhead on a certain downlink subframe, when the frame structure used in the unlicensed frequency band includes a plurality of downlink subframes, the number of uplink subframes scheduled by the plurality of downlink subframes is equalized.

The uplink scheduling method based on the dynamic frame structure in the unlicensed frequency band shown in FIG. 1 further includes:

Step 16, transmitting a scheduling instruction for the uplink subframe to be scheduled on each downlink subframe.

Obviously, in the technical solution of the present disclosure, whether reconfiguration of the frame structure in the unlicensed frequency band is required or is not required, solutions of determining the uplink subframe to be scheduled in the downlink subframe are provided respectively. The method herein provides an optimized uplink scheduling solution in the unlicensed frequency band to ensure a stable and orderly transmission of downlink data for a scene when working with a dynamic frame structure.

Figure 2:
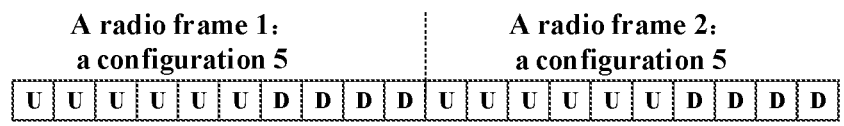
FIG. 2 shows a schematic diagram of a radio frame on a non-reconfigurable time point according to the embodiment of the present disclosure.

The solution shown in FIG. 1 is described in detail below with specific subframe configurations:

Nine frame structures are provided in the present disclosure and respectively include:

Configuration 0: UDDDDDDDDD; Configuration 1: UUDDDDDDDD; Configuration 2: UUUDDDDDDD; Configuration 3: UUUUDDDDDD; Configuration 4: UUUUUDDDDD; Configuration 5: UUUUUUDDDD; Configuration 6: UUUUUUUDDD; Configuration 7: UUUUUUUUDD; Configuration 8: UUUUUUUUUD. The following describes reconfigurable and non-reconfigurable time points:

First, a non-reconfigurable time point occurs:

On a non-reconfigurable time point, the subframe configurations are unchanged. As shown in FIG. 2: since it is the non-reconfigurable time point, both a radio frame 1 and a radio frame 2 adopt the same frame structure configuration, such as configuration 5 for example.

For the above nine frame structures, the present disclosure provides a timing sequence of the uplink scheduling for the nine frame structures respectively, the timing sequences of the uplink scheduling satisfy the following conditions:

1. As information transmission time and calculation processing time of the base station together needs at least 3 ms, there are at least 3 subframes between the downlink subframe that sends the uplink scheduling instruction and the uplink subframe to be scheduled.

2. In order to ensure timeliness of the uplink scheduling, a timing sequence of uplink scheduling instruction in Table 3 schedules the scheduling instruction of the uplink subframe to be transmitted in the downlink subframe that is closest to the uplink subframe and meets the above condition 1 (e.g., there are at least 3 subframes are between each other).

3. In a frame structure in which the downlink subframe is larger than one, the scheduling instruction of the uplink subframe is equally distributed in these downlink subframes, so as to avoid excessive uplink scheduling instruction overhead of a downlink subframe.

Condition 2 and Condition 3 above may not be met at the same time. In actual settings, these two points can be combined to make a consideration.

Based on the above conditions, an optimal timing sequence of the uplink scheduling is shown in Table 3.

TABLE 3

| Configuration | Subframe number n | | | | | | | | | |
|---|---|---|---|---|---|---|---|---|---|---|
| number | 0 | 1 | 2 | 3 | 4 | 5 | 6 | 7 | 8 | 9 |
| 0 | −4 | | | | | | | | | |
| 1 | −4 | −4 | | | | | | | | |
| 2 | −4 | −4 | −4 | | | | | | | |
| 3 | −4 | −4 | −4 | −4 | | | | | | |
| 4 | −4 | −4 | −4 | −4 | −5 | | | | | |
| 5 | −4 | −4 | −5 | −5 | −5 | −6 | | | | |
| 6 | −11 | −4 | −5 | −5 | −6 | −6 | −7 | | | |
| 7 | −12 | −12 | −4 | −5 | −6 | −6 | −7 | −8 | | |
| 8 | −11 | −12 | −13 | −4 | −5 | −6 | −7 | −8 | −9 | |

As shown in Table 3, number k in the table represents: when a Physical Uplink Shared Channel (PUSCH) transmits data on the uplink subframe which has subframe number n, uplink scheduling instruction (e.g., Uplink (UL) grant) of the PUSCH is transmitted in a subframe with a subframe number n−k. When n−k<O, the uplink scheduling instruction is transmitted in a subframe with a subframe number n−k+10 in the previous radio frame.

Figure 3:
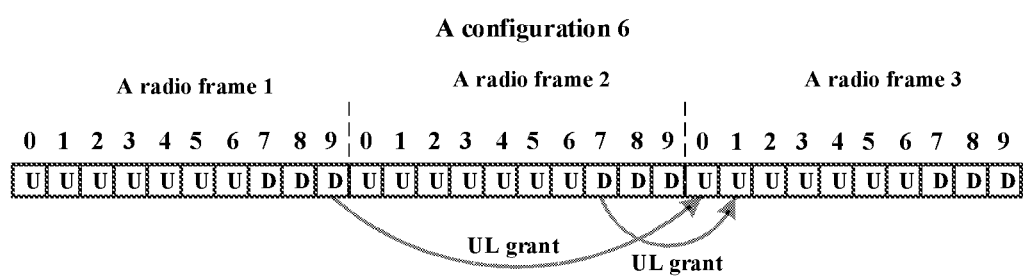
FIG. 3 shows a schematic diagram of a timing sequence of the uplink scheduling on the non-reconfigurable time point according to the embodiment of the present disclosure.

Taking configuration 6 as an example, as shown in FIG. 3, the uplink scheduling instruction of the uplink subframe 1 in the radio frame 3 is transmitted by the downlink subframe 7 in the radio frame 2; and the uplink scheduling instruction of the uplink subframe 0 in the radio frame 3 is transmitted by the downlink subframe 9 in the radio frame 1.

Figure 4:
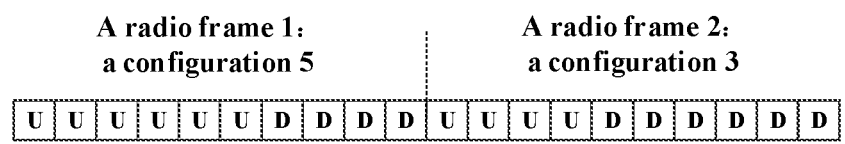
FIG. 4 shows a schematic diagram of a radio frame on a reconfiguration time point according to the embodiment of the present disclosure.

Second, a reconfiguration time point occurs:

On a reconfiguration time point, the subframe configurations change. The radio frame 1 (see FIG. 4) before the reconfiguration time point adopts the configuration 5, the radio frame 2 after the reconfiguration time point adopts the configuration 3. A final radio frame before the reconfiguration time point is called a boundary frame as follows.

Figure 5:
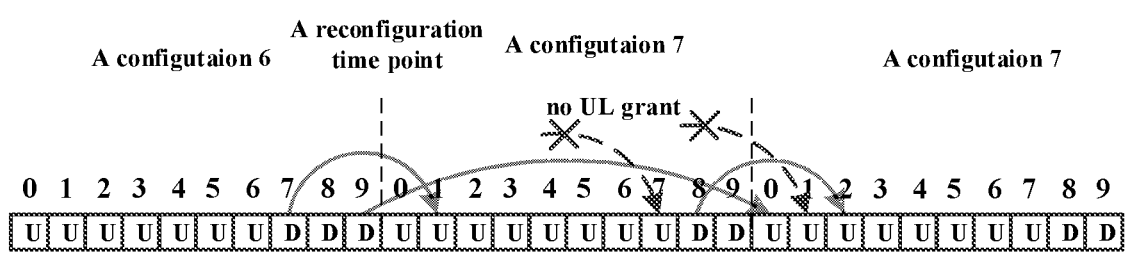
FIG. 5 shows a schematic diagram of waste of resources in uplink scheduling at a reconfiguration time point.

As shown in FIG. 5, the subframe structure on the frequency band is converted from configuration 6 to configuration 7. After the subframe configuration changes, according to the time sequence of the uplink scheduling in Table 3, the subframe 7 in the radio frame after the re-matching point changes from the downlink to the uplink, but there is no downlink subframe sends corresponding scheduling instruction before the re-matching point, which will result in a waste of uplink subframe resources.

The solutions provided by the present disclosure are as below:

1. When the number of downlink subframes in the frame structure after the re-matching point is larger than or equal to the number of downlink subframes in the frame structure before the re-matching point, the timing sequence of the uplink scheduling of the boundary frame makes no change. In this case, a problem that the uplink scheduling instruction is received in the downlink subframe after the re-matching point occurs, thus the received uplink scheduling instruction can be ignored.

2. When the number of downlink subframes in the frame structure after the re-matching point is smaller than the number of downlink subframes in the frame structure before the re-matching point, the timing sequence of the uplink scheduling of the boundary frame adopts the union of the timing sequence of the uplink scheduling corresponding to the frame structure after the re-matching point and the re-matching point at the corresponding location.

Figure 6:
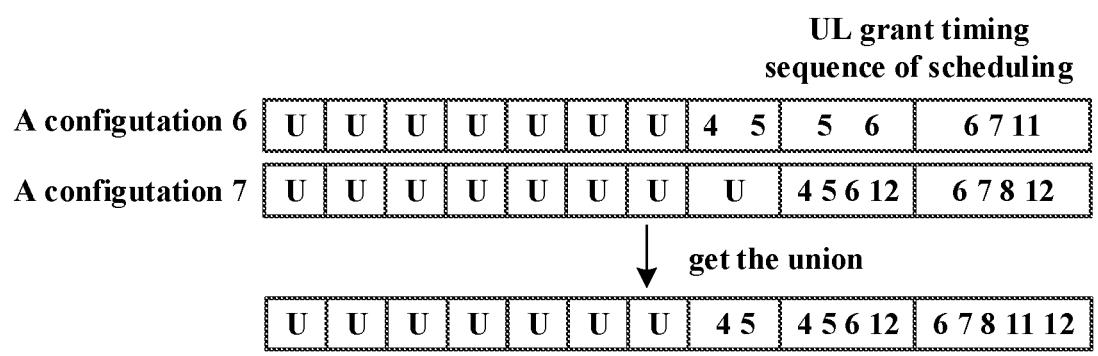
FIG. 6 shows a schematic diagram of a configuration time sequence after union of the uplink scheduling according to boundary frame in the embodiment of the present disclosure.

The following takes a conversion from the configuration 6 to the configuration 7 as an example:

The subframes 7, 8, and 9 of the configuration 6 are downlink subframes, these three subframes respectively send scheduling instruction to the uplink subframes after subframes 4 and 5, subframes 5 and 6, subframes 6, 7 and 11 according to the timing sequence of the uplink scheduling in Table 3. The subframes 8 and 9 of the configuration 7 are downlink subframes, it is necessary to send scheduling instruction to the uplink subframes after subframes 4, 5, 6, and 12, subframes 6, 7, 8, and 12 according to the timing sequence of the uplink scheduling in Table 3, then a way to get their union is shown in FIG. 6. The timing sequence of the uplink scheduling of the boundary frame is configured according to the timing sequence after getting the union. An effect is shown in FIG. 7, and there is no waste of uplink subframes.

Figure 7:
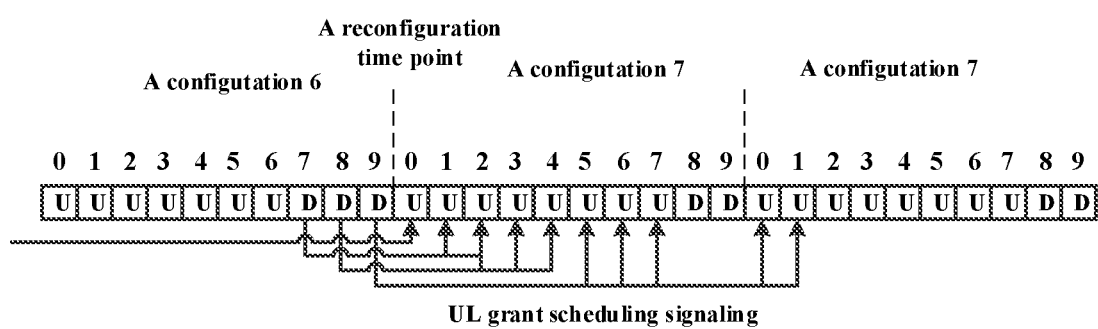
FIG. 7 shows a schematic diagram of a timing sequence of the uplink scheduling at a reconfiguration time point according to the embodiment of the present disclosure.

It can be seen from FIG. 7 that the problem that the uplink scheduling instruction is missing in the uplink subframe 1 in the radio frame after the reconfiguration is solved. In addition, FIG. 7 also appears: the subframe 2 in the radio frame after the re-matching point receives the uplink scheduling instruction from the subframe 7 of the boundary frame, and also receives the scheduling instruction of the subframe 8 of the boundary frame. As the time for sending the uplink scheduling instruction to the uplink subframe is shorter, the system performance is better. Therefore, it can be specified that when more than one uplink scheduling instruction is received in one uplink subframe, the latest received uplink scheduling instruction is used to ensure communication quality. Of course, the base station can also perform comprehensive analysis to ensure that the uplink scheduling instruction on each uplink subframe is transmitted in one downlink sub frame.

Figure 8:
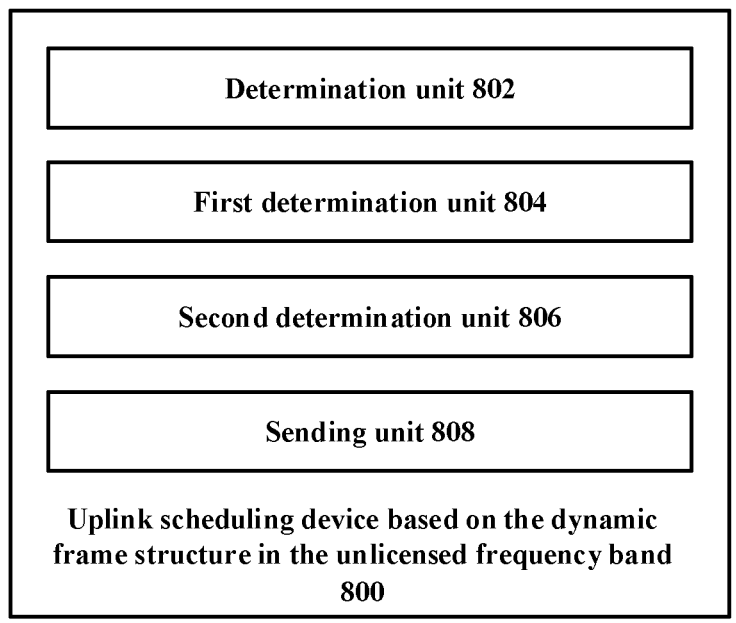
FIG. 8 shows a schematic block diagram of an uplink scheduling device according to the embodiment of the present disclosure.

Based on the dynamic frame structure provided above by the present disclosure, an uplink scheduling device based on the dynamic frame structure in the unlicensed frequency band is provided in the present disclosure. As shown in FIG. 8, the uplink scheduling device 800 includes a determination unit 802, a first determination unit 804, a second determination unit 806, and a sending unit 908.

The determination unit 802 is configured to determine whether a currently used frame structure in an unlicensed frequency band needs to be reconfigured; a first determination unit 804 is configured to determine an uplink subframe to be scheduled on each downlink subframe according to the currently used frame structure when the determination unit 802 determines that the currently used frame structure in the unlicensed frequency band does not need to be reconfigured; a second determination 806 unit is configured to determine an uplink subframe to be scheduled on each downlink subframe in a last radio frame before a reconfiguration time point according to a first frame structure used before the reconfiguration time point and a second frame structure to be used when the determination unit 802 determines that the currently used frame structure in the unlicensed frequency band needs to be reconfigured; sending unit 808 is configured to transmit a scheduling instruction for the uplink subframe to be scheduled on each downlink subframe.

In the embodiment, since each frame structure in the unlicensed frequency band includes the uplink subframes and the downlink subframes, a special subframe converted from the downlink to the uplink is discarded, thus time-frequency resources can be fully utilized. A channel detection is required when working in the unlicensed frequency band, therefore, by setting and including subframe continuity of the same type in each frame structure, that is, by setting continuities of the uplink subframes and the downlink subframes in each frame structure respectively, channel occupancy time can be maximized after occupying channel resources each time, and instantaneous throughput can be maximized.

As the present disclosure adopts dynamic frame structure in the unlicensed frequency band, that is, the frame structure can be dynamically configured according to uplink and downlink traffic. Therefore, when it is not necessary to reconfigure the frame structure, the uplink subframe to be scheduled for each downlink subframe is directly determined according to a current frame structure. When it is necessary to reconfigure the frame structure, as the frame structure used before and after a reconfiguration time point may be changed, when determining a timing sequence of an uplink scheduling in the last radio frame before the reconfiguration time point, the frame structure used before and after the reconfiguration time point needs to be considered. Obviously, in the technical solution of the present disclosure, in a case that the reconfiguration of the frame structure in the unlicensed frequency band is required or is not required, solutions of determining the uplink subframe to be scheduled in the downlink subframe are provided respectively. The technical solution of the present disclosure provides the optimized uplink scheduling solution in the unlicensed frequency band to ensure a stable and orderly transmission of downlink data for a scene when working with a dynamic frame structure.

In above technical solution, optionally, the first determination unit 804 is specifically configured to determine the uplink subframe to be scheduled on each downlink subframe according to a timing sequence of the uplink scheduling corresponding to the currently used frame structure.

In this technical solution, several types of frame structure are provided in the present disclosure. Therefore, when it is not necessary to reconfigure the frame structure, the uplink subframe to be scheduled on each downlink subframe can be determined according to the timing sequence of the uplink scheduling corresponding to the currently used frame structure.

In any of the above technical solutions, optionally, the second determination unit 806 is specifically configured to determine the uplink subframe to be scheduled on each downlink subframe in the last radio frame before the reconfiguration time point according to a number of downlink subframes in the first frame structure and a number of downlink subframes in the second frame structure.

In this technical solution, when reconfiguration is necessary, the frame structure used before and after the reconfiguration time point may be changed, that is, the number of downlink subframes and uplink subframe in the frame structure may be changed. Therefore, to ensure stability and order of timing sequence of the uplink scheduling and to avoid a waste of resources, the uplink subframe to be scheduled on each downlink subframe in the last radio frame before the reconfiguration time point is needed to be determined, according to the number of downlink subframes used in the frame structure used before and after the reconfiguration time point.

In above technical solution, optionally, the second determination unit 806 is also specifically configured to determine the uplink subframe to be scheduled on each downlink subframe in the last radio frame before the reconfiguration time point according to the timing sequence of the uplink scheduling corresponding to the first frame structure when the number of the downlink subframes in the first frame structure is less than or equal to the number of the downlink subframes in the second frame structure.

Determine the uplink subframe to be scheduled on each downlink subframe in the last radio frame before the reconfiguration time point according to a union of the timing sequence of the first uplink scheduling and the timing sequence of the second uplink scheduling when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure.

In the technical solution, when the number of downlink subframes used in the first frame structure is less than or equal to the number of downlink subframes to be used in the second frame structure before the reconfiguration time point, the timing sequence of the uplink scheduling of the last radio frames before the reconfiguration time point may still use the timing sequence of the uplink scheduling corresponding to the first frame structure, so that when the uplink scheduling instruction is received on the downlink subframe after the reconfiguration time point, it will be ignored. When the number of the downlink subframes used in the first frame structure is larger than the number of the downlink subframes used in the second frame structure before the reconfiguration time point, in order to ensure that each uplink subframe in the first radio frame after the reconfiguration time point can be scheduled, determining the uplink subframe to be scheduled on each downlink subframe in the last radio frames before the reconfiguration time point according to the union of the timing sequence of the uplink scheduling corresponding to the first frame structure and the timing sequence of the uplink scheduling corresponding to the second frame structure.

In an embodiment of the present disclosure, the sending unit 808 is also configured to send a scheduling instruction for the same uplink subframe in one of the at least two downlink subframes when the second determination unit 806 determines at least two downlink subframes are needed to schedule the same uplink subframe according to the union of the first timing sequence of the uplink scheduling and the second timing sequence of the uplink scheduling.

In this embodiment, as the uplink subframe to be scheduled on each downlink subframe in the last radio frame before the reconfiguration time point is determined according to the union of the timing sequence of the uplink scheduling corresponding to the first frame structure and the timing sequence of the uplink scheduling corresponding to the second frame structure, there may be a problem that at least two downlink subframes schedule the same uplink subframe. When the problem occurs, a base station may send a scheduling instruction for the same uplink subframe in one of the at least two downlink subframes, to ensure that a terminal receives one uplink scheduling instruction in one uplink subframe.

In another embodiment of the disclosure, the sending unit 808 is also configured to send a notification instruction to the terminal when the second determination unit 806 determines that at least two downlink subframes are needed to schedule the same uplink subframe according to the union of the first timing sequence of the uplink scheduling and the second timing sequence of the uplink scheduling. Therefore when the terminal receives a plurality of scheduling instructions in one subframe, the latest received scheduling instruction is used.

In this embodiment, since the uplink subframe to be scheduled on each downlink subframe in the last radio frame before the reconfiguration time point is determined according to the union of the timing sequence of the uplink scheduling corresponding to the first frame structure and the timing sequence of the uplink scheduling corresponding to the second frame structure, there may be a problem that at least two downlink subframes schedule the same uplink subframe. When the problem occurs, the base station may send a notification instruction to the terminal, so that when the terminal receives a plurality of scheduling instructions in one subframe, the latest received scheduling instruction is adopted, thereby avoiding a problem of scheduling chaos when receiving a plurality of scheduling instructions on one subframe.

In any of the above technical solutions, optionally, a subframe interval between each downlink subframe and the uplink subframe to be scheduled is larger than or equal to 3, and is less than or equal to a predetermined value.

In this technical solution, as information transmission time and calculation processing time of the base station together needs at least 3 ms, the subframe interval between each downlink subframe and the uplink subframe to be scheduled should be larger than or equal to 3. For example, when a subframe n is a downlink subframe, the closest uplink subframe scheduled by the subframe n should be n+4 (there are 3 subframes between the closest uplink subframe and the subframe n). In addition, in order to ensure a timeliness of the scheduling, the subframe interval between each downlink subframe and the uplink subframe to be scheduled should be less than or equal to the predetermined value, that is, the uplink subframe to be scheduled on each downlink subframe is arranged to be as close as possible to the downlink subframe.

In any of the above technical solutions, optionally, when the frame structure used in the unlicensed frequency band includes a plurality of downlink subframes, the number of uplink subframes scheduled by the plurality of downlink subframes is equalized.

In this technical solution, by equalizing the number of the uplink subframes scheduled by the plurality of downlink subframes, excessive uplink scheduling instruction as an overhead on a certain downlink subframe can be avoided.

Figure 9:
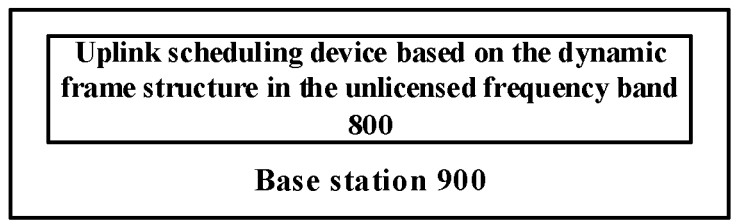
FIG. 9 shows a schematic structural diagram of a base station according to the embodiment of the present disclosure.

FIG. 9 shows a base station according to the embodiment of the present disclosure.

As shown in FIG. 9, a base station 900 according to the embodiment of the present disclosure includes an uplink scheduling device 800 based on a dynamic frame structure in an unlicensed frequency band shown in FIG. 8.

Figure 10:
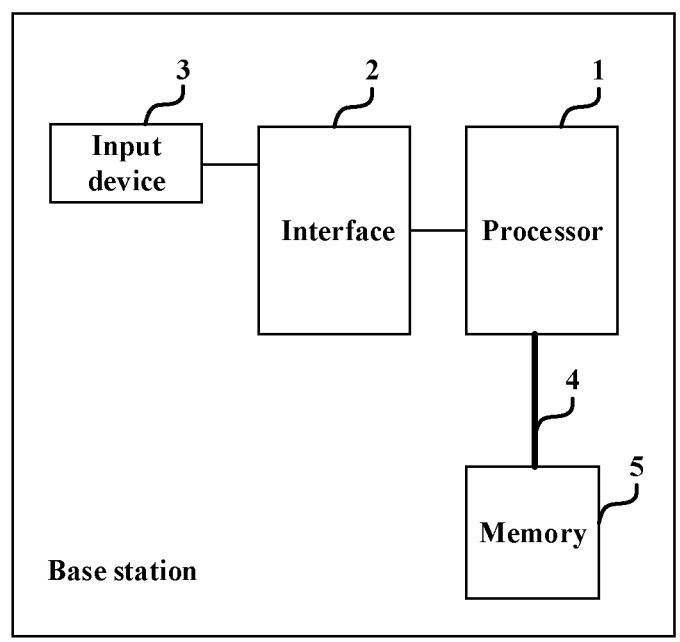
FIG. 10 shows a schematic structural diagram of a base station according to another embodiment of the present disclosure.

FIG. 10 shows a base station according to another embodiment of the present disclosure.

As shown in FIG. 10, a base station of another embodiment includes a processor 1 and an input device 3. The input device 3 is connected to the processor 1 through an interface 2, and a memory 5 is connected to the processor 1 through a bus 4. The memory 5 is used to store program codes, the processor 1 can invoke program codes stored in the memory 5, and the processor 1 can execute the following operations:

Determining whether a currently used frame structure in the unlicensed frequency band needs to be reconfigured through the input device 3; when it is determined that the currently used frame structure in the unlicensed frequency band does not need to be reconfigured, determining an uplink subframe to be scheduled on each downlink subframe according to the currently used frame structure; when it is determined that the currently used frame structure in the unlicensed frequency band needs to be reconfigured, determining an uplink subframe to be scheduled on each downlink subframe in a last radio frame before a reconfiguration time point according to a first frame structure used before the reconfiguration time point and a second frame structure to be used; transmitting a scheduling instruction for the uplink subframe to be scheduled on each downlink subframe.

As an optional embodiment, the processor 1 further executes following operations: when at least two downlink subframes need to schedule the same uplink subframe according to the union of the first timing sequence of the uplink scheduling and the second timing sequence of the uplink scheduling, sending a notification instruction to the terminal. Therefore when the terminal receives a plurality of scheduling instructions in one subframe, the latest received scheduling instruction is used.

As an optional embodiment, the processor 1 executes an operation for determining the uplink subframe to be scheduled on each downlink subframe in the last radio frame before the reconfiguration time point according to the first frame structure used before the reconfiguration time point and the second frame structure to be used, which specifically includes: determining the uplink subframe to be scheduled on each downlink subframe in the last radio frame before the reconfiguration time point according to a number of downlink subframes in the first frame structure and a number of downlink subframes in the second frame structure.

As an optional embodiment, the processor 1 further executes following operations: determining the uplink subframe to be scheduled on each downlink subframe in the last radio frame before the reconfiguration time point according to the timing sequence of the uplink scheduling corresponding to the first frame structure when the number of the downlink subframes in the first frame structure is less than or equal to the number of the downlink subframes in the second frame structure.

As an optional embodiment, the processor 1 further executes following operations: determining the uplink subframe to be scheduled on each downlink subframe in the last radio frame before the reconfiguration time point according to a union of the timing sequence of the first uplink scheduling and the timing sequence of the second uplink scheduling when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure.

As an optional embodiment, the processor 1 further executes following operations: when at least two downlink subframes need to schedule the same uplink subframe according to the union of the first timing sequence of the uplink scheduling and the second timing sequence of the uplink scheduling, a scheduling instruction for the same uplink subframe is sent in one of the at least two downlink subframes.

As an optional embodiment, the processor 1 further executes following operations: when at least two downlink subframes need to schedule the same uplink subframe according to the union of the first timing sequence of the uplink scheduling and the second timing sequence of the uplink scheduling, sending a notification instruction to the terminal. Therefore when the terminal receives a plurality of scheduling instructions in one subframe, merely the latest received scheduling instruction is used.

The method disclosed in embodiments can be used for sequentially adjusting, merging, and deleting according to actual needs.

The units in the base station in the embodiment of the present disclosure can be merged, divided, and deleted according to actual needs.

Persons of ordinary skill in the art understand that all or part of the steps of the various methods of the embodiments can be completed by programs, the programs can be stored in a computer readable storage medium, the storage medium includes a Read-Only Memory (ROM), a Random Access Memory (RAM), a Programmable Read-only Memory (PROM), an Erasable Programmable Read Only Memory (EPROM), an One-time Programmable Read-Only Memory (OTPROM), an Electrically-Erasable Programmable Read-Only Memory (EEPROM), a Compact Disc Read-Only Memory (CD-ROM), or other optical disk storage, a magnetic disk storage, a magnetic tape storage, or any other medium which can be read by a computer that can be used for carrying or storing data.

The present disclosure is made with reference to accompanying drawings. The present disclosure provides a new downlink HARQ feedback method based on a dynamic frame structure in an unlicensed frequency band. For a dynamic frame structure, a downlink HARQ feedback method in the unlicensed frequency band is provided, to overcome the lack of the timing sequence of the downlink HARQ feedback when using the dynamic subframe configuration in the unlicensed frequency band, and to ensure a stable and orderly transmission of downlink data, ensuring efficient use of time-frequency resources and improving performance of a system.

The above mentioned descriptions are preferred embodiments of the present disclosure, and are not to limit the disclosure. For persons skilled in the art, various changes or modifications may be made to the present disclosure. Any modification, equivalent, and improvement without departing from the spirit and scope of the present disclosure, should be within the protection scope of the present disclosure.

We claim:

1. An uplink scheduling method in an unlicensed frequency band based on a dynamic frame structure, each frame structure adopted in the unlicensed frequency band comprising uplink subframes and downlink subframes, and each frame structure having a same type of subframe continuity settings, the uplink scheduling method comprising:
determining whether a currently used frame structure in an unlicensed frequency band needs to be reconfigured;
determining an uplink subframe to be scheduled on each downlink subframe according to the currently used frame structure, when it is determined that the currently used frame structure in the unlicensed frequency band does not need to be reconfigured;

determining an uplink subframe to be scheduled on each downlink subframe in a last radio frame before a reconfiguration time point according to a number of downlink subframes in a first frame structure used before the reconfiguration time point and a number of downlink subframes in a second frame structure to be used, when it is determined that the currently used frame structure in the unlicensed frequency band needs to be reconfigured; the uplink scheduling method further comprising: determining the uplink subframe to be scheduled on each downlink subframe in the last radio frame before the reconfiguration time point according to an union of the timing sequence of the first uplink scheduling and the timing sequence of the second uplink scheduling, when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure;

transmitting a scheduling instruction for the uplink subframe to be scheduled on each downlink subframe.

2. The uplink scheduling method in the unlicensed frequency band based on the dynamic frame structure of claim 1, wherein determining the uplink subframe to be scheduled on each downlink subframe according to the currently used frame structure comprises:

determining the uplink subframe to be scheduled on each downlink subframe according to a timing sequence of the uplink scheduling corresponding to the currently used frame structure.

3. The uplink scheduling method in the unlicensed frequency band based on the dynamic frame structure of claim 1, further comprising:

determining the uplink subframe to be scheduled on each downlink subframe in the last radio frame before the reconfiguration time point according to the timing sequence of the uplink scheduling corresponding to the first frame structure, when the number of the downlink subframe in the first frame structure is less than or equal to the number of the downlink subframe in the second frame structure.

4. The uplink scheduling method in the unlicensed frequency band based on the dynamic frame structure of claim 1, further comprising:

sending a scheduling instruction for the same uplink subframe in one of the at least two downlink subframes, when at least two downlink subframes need to schedule the same uplink subframe according to the union of the first timing sequence of the uplink scheduling and the second timing sequence of the uplink scheduling.

5. The uplink scheduling method in the unlicensed frequency band based on the dynamic frame structure of claim 1, further comprising:

sending a notification instruction to the terminal to ensure when the terminal receives a plurality of scheduling instructions in one subframe, merely the latest received scheduling instruction is used, when at least two downlink subframes need to schedule the same uplink subframe according to the union of the first timing sequence of the uplink scheduling and the second timing sequence of the uplink scheduling.

6. The uplink scheduling method in the unlicensed frequency band based on the dynamic frame structure of claim 1, wherein a subframe interval between each downlink subframe and the uplink subframe to be scheduled is larger than or equal to 3, and is less than or equal to a predetermined value.

7. The uplink scheduling method in the unlicensed frequency band based on the dynamic frame structure of claim 1, wherein when the frame structure used in the unlicensed frequency band comprises a plurality of downlink subframes, the number of uplink subframes scheduled by the plurality of downlink subframes is equalized.

8. A base station, comprising:

at least one processor; and a storage device storing a plurality of instructions, which when executed by the processor, causes the at least one processor to:

determine whether a currently used frame structure in an unlicensed frequency band needs to be reconfigured;

determine an uplink subframe to be scheduled on each downlink subframe according to the currently used frame structure, when it is determined that the currently used frame structure in the unlicensed frequency band does not need to be reconfigured;

determine an uplink subframe to be scheduled on each downlink subframe in a last radio frame before a reconfiguration time point according to a number of downlink subframes in a first frame structure used before the reconfiguration time point and a number of downlink subframes in a second frame structure to be used, when it is determined that the currently used frame structure in the unlicensed frequency band needs to be reconfigured; wherein the at least one processor further: determines the uplink subframe to be scheduled on each downlink subframe in the last radio frame before the reconfiguration time point according to an union of the timing sequence of the first uplink scheduling and the timing sequence of the second uplink scheduling, when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure;

transmit a scheduling instruction for the uplink subframe to be scheduled on each downlink subframe.

9. The base station of claim 8, wherein the at least one processor further:

determines the uplink subframe to be scheduled on each downlink subframe according to a timing sequence of the uplink scheduling corresponding to the currently used frame structure.

10. The base station of claim 8, wherein the at least one processor further:

determines the uplink subframe to be scheduled on each downlink subframe in the last radio frame before the reconfiguration time point according to the timing sequence of the uplink scheduling corresponding to the first frame structure, when the number of the downlink subframe in the first frame structure is less than or equal to the number of the downlink subframe in the second frame structure.

11. The base station of claim 8, wherein the at least one processor further:

send a scheduling instruction for the same uplink subframe in one of the at least two downlink subframes, when at least two downlink subframes need to schedule the same uplink subframe according to the union of the first timing sequence of the uplink scheduling and the second timing sequence of the uplink scheduling.

12. The base station of claim 8, wherein the at least one processor further:
send a notification instruction to the terminal to ensure when the terminal receives a plurality of scheduling instructions in one subframe, merely the latest received scheduling instruction is used, when at least two downlink subframes need to schedule the same uplink subframe according to the union of the first timing sequence of the uplink scheduling and the second timing sequence of the uplink scheduling.

13. The base station of claim 8, wherein a subframe interval between each downlink subframe and the uplink subframe to be scheduled is larger than or equal to 3, and is less than or equal to a predetermined value.

14. The base station of claim 8, wherein when the frame structure used in the unlicensed frequency band includes a plurality of downlink subframes, the number of uplink subframes scheduled by the plurality of downlink subframes is equalized.

15. A non-transitory storage medium having stored thereon instructions that, when executed by a processor of a base station, causes the processor of the base station to perform an uplink scheduling method in an unlicensed frequency band based on a dynamic frame structure, the uplink scheduling method comprising:
determining whether a currently used frame structure in an unlicensed frequency band needs to be reconfigured;
determining an uplink subframe to be scheduled on each downlink subframe according to the currently used frame structure, when it is determined that the currently used frame structure in the unlicensed frequency band does not need to be reconfigured;
determining an uplink subframe to be scheduled on each downlink subframe in a last radio frame before a reconfiguration time point according to a number of downlink subframes in a first frame structure used before the reconfiguration time point and a number of downlink subframes in a second frame structure to be used, when it is determined that the currently used frame structure in the unlicensed frequency band needs to be reconfigured; the uplink scheduling method further comprising: determining the uplink subframe to be scheduled on each downlink subframe in the last radio frame before the reconfiguration time point according to an union of the timing sequence of the first uplink scheduling and the timing sequence of the second uplink scheduling, when the number of downlink subframes in the first frame structure is larger than the number of downlink subframes in the second frame structure, the timing sequence of the first uplink scheduling being the timing sequence of the uplink scheduling corresponding to the first frame structure, and the timing sequence of the second uplink scheduling being the timing sequence of the uplink scheduling corresponding to the second frame structure;
transmitting a scheduling instruction for the uplink subframe to be scheduled on each downlink subframe.

16. The non-transitory storage medium according to claim 15, wherein determining the uplink subframe to be scheduled on each downlink subframe according to the currently used determining the uplink subframe to be scheduled on each downlink subframe according to a timing sequence of the uplink scheduling corresponding to the currently used frame structure.

17. The non-transitory storage medium according to claim 15, further comprising:
determining the uplink subframe to be scheduled on each downlink subframe in the last radio frame before the reconfiguration time point according to the timing sequence of the uplink scheduling corresponding to the first frame structure, when the number of the downlink subframe in the first frame structure is less than or equal to the number of the downlink subframe in the second frame structure.

18. The non-transitory storage medium according to claim 15, further comprising:
sending a scheduling instruction for the same uplink subframe in one of the at least two downlink subframes, when at least two downlink subframes need to schedule the same uplink subframe according to the union of the first timing sequence of the uplink scheduling and the second timing sequence of the uplink scheduling.

19. The non-transitory storage medium according to claim 15, further comprising:
sending a notification instruction to the terminal to ensure when the terminal receives a plurality of scheduling instructions in one subframe, merely the latest received scheduling instruction is used, when at least two downlink subframes need to schedule the same uplink subframe according to the union of the first timing sequence of the uplink scheduling and the second timing sequence of the uplink scheduling.

20. The non-transitory storage medium according to claim 15, wherein a subframe interval between each downlink subframe and the uplink subframe to be scheduled is larger than or equal to 3, and is less than or equal to a predetermined value.

* * * * *